United States Patent
Degawa et al.

(10) Patent No.: US 12,029,333 B2
(45) Date of Patent: Jul. 9, 2024

(54) PRODUCT MANAGEMENT SYSTEM, PRODUCT MANAGEMENT APPARATUS, AND DISPLAY ZONE COMMUNICATION APPARATUS

(71) Applicant: KYOCERA Corporation, Kyoto (JP)

(72) Inventors: Tomohiro Degawa, Tokyo (JP);
Masashi Fujisawa, Yokohama (JP);
Masanori Morobishi, Yokohama (JP);
Masaki Kambe, Yokohama (JP);
Fumihiro Matsusaki, Yokohama (JP);
Kazuyuki Takaki, Kawasaki (JP);
Akira Kawasaki, Kawasaki (JP);
Masatoshi Yanase, Yokosuka (JP)

(73) Assignee: KYOCERA Corporation, Kyoto (JP)

( * ) Notice: Subject to any disclaimer, the term of this patent is extended or adjusted under 35 U.S.C. 154(b) by 293 days.

(21) Appl. No.: 17/590,371

(22) Filed: Feb. 1, 2022

(65) Prior Publication Data

US 2022/0151404 A1    May 19, 2022

Related U.S. Application Data

(63) Continuation of application No. PCT/JP2020/028843, filed on Jul. 28, 2020.

(30) Foreign Application Priority Data

Aug. 5, 2019 (JP) .................................. 2019-143935
Sep. 2, 2019 (JP) .................................. 2019-159973

(51) Int. Cl.
A47F 7/19 (2006.01)
A47G 25/14 (2006.01)
(Continued)

(52) U.S. Cl.
CPC ............. *A47F 7/19* (2013.01); *A47G 25/1407* (2013.01); *A47G 25/32* (2013.01); *H04W 4/80* (2018.02); *A47F 2010/005* (2013.01)

(58) Field of Classification Search
None
See application file for complete search history.

(56) References Cited

U.S. PATENT DOCUMENTS

2008/0215427 A1* 9/2008 Kawada ............. G06Q 30/0267
705/14.51
2016/0055566 A1* 2/2016 Otani ................. G06Q 30/0201
705/7.29

(Continued)

FOREIGN PATENT DOCUMENTS

JP    2003-308429 A    10/2003
JP    2005339132 A  * 12/2005

(Continued)

*Primary Examiner* — K. Wong
(74) *Attorney, Agent, or Firm* — Studebaker & Brackett PC

(57) ABSTRACT

A product management system includes a product management apparatus, a product wireless tag provided on the product and into which a product identifier indicating the product is written, a tool wireless tag provided on a holding tool for holding the product and into which a tool identifier indicating the holding tool is written, a display zone communication apparatus provided in a display zone in which at least one set of the product and the holding tool is disposed and having a wireless tag reader for reading the product identifier from the product wireless tag and reading the tool identifier from the tool wireless tag. The display zone communication apparatus transmits both the product identifier and the tool identifier read by the wireless tag reader to the product management apparatus. The product management apparatus links the holding tool and the product held by the holding tool with each other.

10 Claims, 13 Drawing Sheets

(51) Int. Cl.
    *A47G 25/32*     (2006.01)
    *H04W 4/80*     (2018.01)
    *A47F 10/00*     (2006.01)

(56) References Cited

U.S. PATENT DOCUMENTS

2017/0112315 A1*   4/2017   Shin ........................ H04W 4/80
2022/0156794 A1*   5/2022   Degawa ............. G06K 7/10425

FOREIGN PATENT DOCUMENTS

| | | | | |
|---|---|---|---|---|
| JP | 2009234712 A | * | 10/2009 | |
| WO | WO-2009031373 A1 | * | 3/2009 | ............. G06K 17/00 |
| WO | WO-2022097603 A1 | * | 5/2022 | |

* cited by examiner

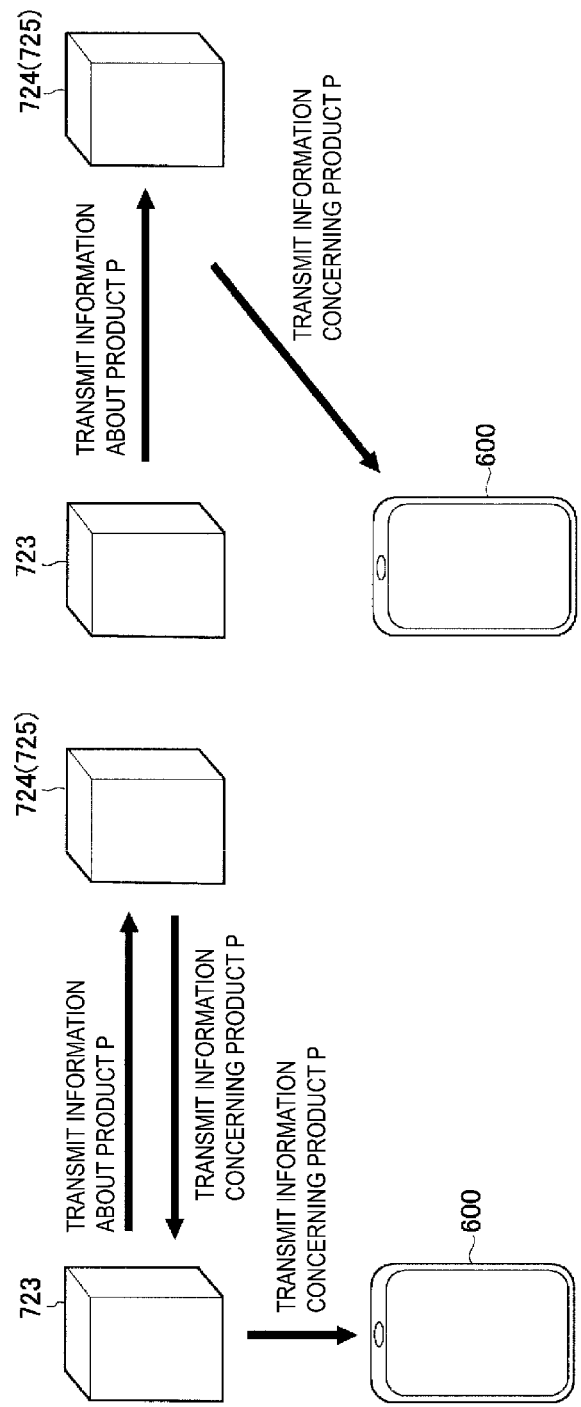

PRODUCT MANAGEMENT SYSTEM, PRODUCT MANAGEMENT APPARATUS, AND DISPLAY ZONE COMMUNICATION APPARATUS

RELATED APPLICATIONS

The present application is a continuation based on PCT Application No. PCT/JP2020/028843, filed on Jul. 28, 2020, which claims the benefit of Japanese Patent Application No. 2019-143935 filed on Aug. 5, 2019 and Japanese Patent Application No. 2019-159973 filed on Sep. 2, 2019. The content of which is incorporated by reference herein in their entirety.

TECHNICAL FIELD

The present disclosure relates to a product management system, a product management apparatus, and a display zone communication apparatus.

BACKGROUND ART

Patent Document 1 describes a system for marketing support for the apparel industry, the system being provided with an RFID hanger with a sensor for holding a product, a hanger rack with an RF receiver on which the RFID hanger is disposed, and a server.

In the system described in Patent Document 1, when the sensor senses that the RFID hanger with the sensor is taken out from the hanger rack with the RF receiver, the RFID hanger with the sensor transmits a hanger identifier. The hanger rack with the RF receiver receives the hanger identifier from the RFID hanger and transmits the hanger identifier to the server.

The server includes an association table between a product identifier and the hanger identifier. The server uses this association table to convert the hanger identifier from the hanger rack with the RF receiver into the product identifier, and determines which product is selected by a user (customer).

CITATION LIST

Patent Literature

Patent Document 1: Japanese application publication No. 2003-308429

SUMMARY

A product management system according to a first aspect includes a product management apparatus for managing a product, a product wireless tag provided on the product and into which a product identifier indicating the product is written, a tool wireless tag provided on a holding tool and into which a tool identifier indicating the holding tool is written, the holding tool being for holding the product, a display zone communication apparatus provided in a display zone in which at least one set of the product and the holding tool is disposed and including a wireless tag reader for reading the product identifier from the product wireless tag and reading the tool identifier from the tool wireless tag. The display zone communication apparatus transmits both the product identifier and the tool identifier read by the wireless tag reader to the product management apparatus. The product management apparatus links the holding tool and the product held by the holding tool with each other based on the product identifier and the tool identifier from the display zone communication apparatus.

A product management apparatus according to a second aspect is an apparatus for managing a product. The product management apparatus includes a receiver for receiving a product identifier and a tool identifier read by a display zone communication apparatus from a product wireless tag and a tool wireless tag, respectively, from the display zone communication apparatus provided in a display zone in which at least one set of a product including the product wireless tag and a holding tool including the tool wireless tag is disposed, and a controller for linking the holding tool and the product held by the holding tool with each other based on the product identifier and the tool identifier received by the receiver.

A display zone communication apparatus according to a third aspect is an apparatus provided in a display zone in which at least one set of a product and a holding tool is disposed. The display zone communication apparatus includes a wireless tag reader for reading a product identifier from a product wireless tag provided on the product and reading a tool identifier from a tool wireless tag provided on the holding tool, and a transmitter for transmitting both the product identifier and the tool identifier read by the wireless tag reader to a product management apparatus for managing the product.

BRIEF DESCRIPTION OF DRAWINGS

FIGS. 12A and 12B are a diagram illustrating an example of communication between a plurality of the product management apparatuses included in the product management apparatus and the user communication apparatus according to one embodiment.

DESCRIPTION OF EMBODIMENTS

Although the system described in Patent Document 1 can identify a product in which a user is interested, an association table for linking a product identifier and a hanger identifier with each other needs to be registered in a server in advance. It is troublesome for a store clerk to register such linkage for a large number of products in the server, and there is a problem in that the burden involved in the linking operation increases. Moreover, in a store, the correspondence relationship between the product and the hanger may be changed when the product being tried on or the like.

Thus, an object of the present disclosure is to enable efficient management of the link between the product and a holding tool thereof.

Embodiments will be described with reference to the drawings. In the description of the drawings, the same or similar parts are denoted by the same or similar reference signs.

Figure 1:
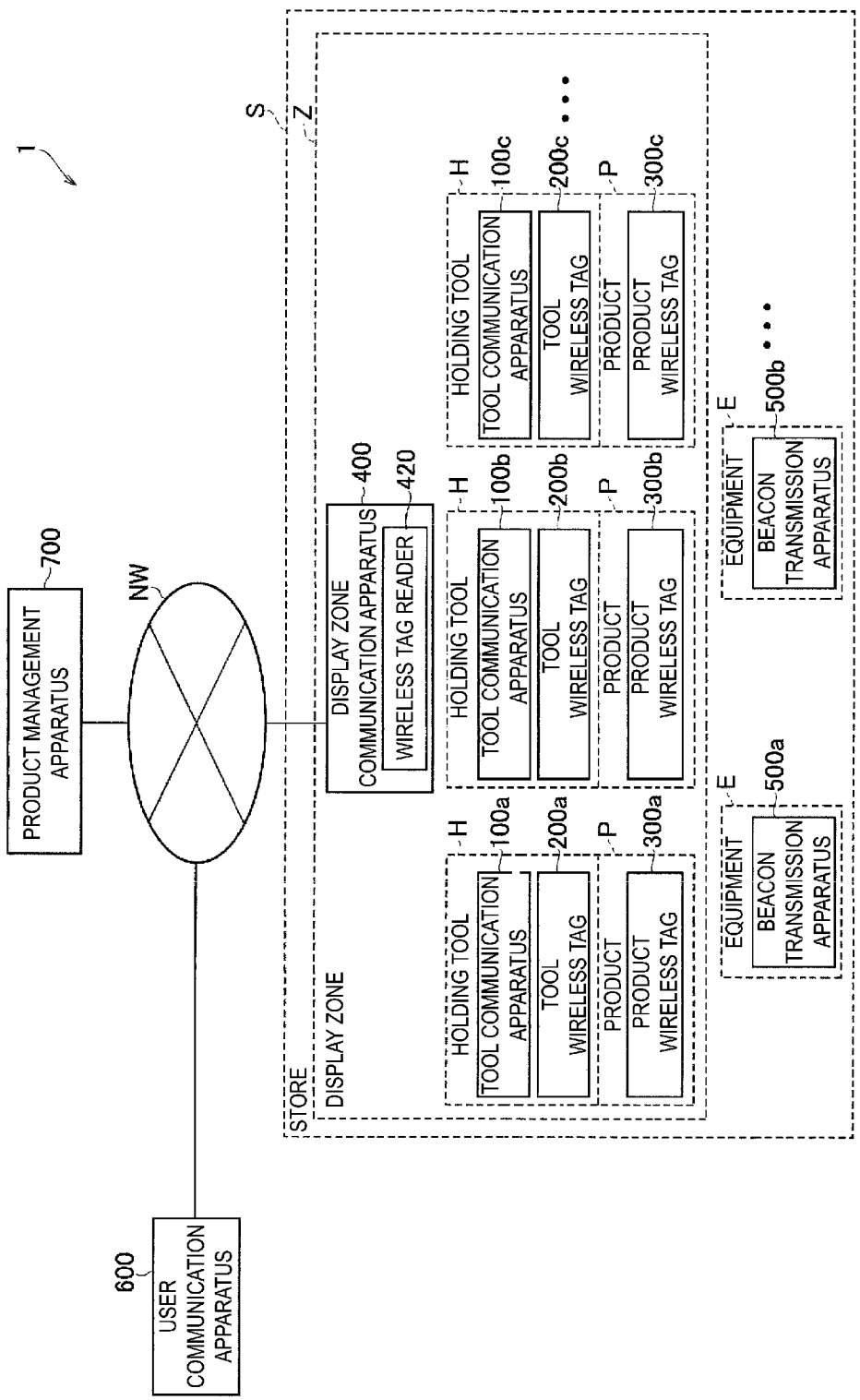
FIG. 1 is a diagram illustrating a configuration of a product management system according to one embodiment.

Configuration of Product Management System First, a configuration of a product management system according to one embodiment will be described. FIG. 1 is a diagram illustrating a configuration of a product management system 1 according to one embodiment.

As illustrated in FIG. 1, the product management system 1 includes a plurality of tool communication apparatuses 100 (100*a*, 100*b*, 100*c* . . . ), a plurality of tool wireless tags 200 (200*a*, 200*b*, 200*c* . . . ), a plurality of product wireless tags 300 (300*a*, 300*b*, 300*c* . . . ), a display zone communication apparatus 400, a plurality of beacon transmission apparatuses 500 (500*a*, 500*b* . . . ), a user communication apparatus 600, and a product management apparatus 700.

In one embodiment, the tool communication apparatus 100, the tool wireless tag 200, the product wireless tag 300, the display zone communication apparatus 400, and the beacon transmission apparatus 500 are provided in a store S, where the store S is an apparel store. In the following, an example in which the store S is the apparel store will be mainly described, but the store S may be any store as long as the store sells the product P, and may be, for example, a supermarket, a vegetable store, or a fish store.

The tool communication apparatus 100, the tool wireless tag 200, the product wireless tag 300, and the display zone communication apparatus 400 are provided in a display zone Z in which at least one set of the product P and a holding tool H is disposed, where the display zone Z is a hanger rack. In the following, an example in which the display zone Z is the hanger rack will be mainly described, but the display zone Z may be any zone as long as the zone displays the product P, and may be, for example, a display shelf or a showcase. An example in which one display zone Z is provided in the store S will be mainly described, but a plurality of the display zones Z may be provided in the store S.

The tool communication apparatus 100 and the tool wireless tag 200 are provided on the holding tool H holding the product P, where the holding tool H is a hanger. In the following, an example in which the holding tool H is a hanger will be mainly described, but the holding tool H may be any tool as long as the tool is for holding the product P, and may be, for example, a tray or a product fixing tool. An example in which a plurality of the sets of the holding tool H and the product P is disposed in the display zone Z will be mainly described, but one set of the holding tool H and product P may be disposed in the display zone Z.

The tool communication apparatus 100 is a communication apparatus provided on the holding tool H. The tool communication apparatus 100 may be incorporated into the holding tool H or may be mounted to a surface of the holding tool H.

The tool wireless tag 200 is a wireless tag provided on the holding tool H. A tool identifier indicating the holding tool H is written into the tool wireless tag 200. The wireless tag may be referred to as an IC tag, an RFID, or an RF tag. In the following, an example in which the wireless tag is a passive wireless tag will be mainly described, but the wireless tag may be an active wireless tag. The tool wireless tag 200 may be incorporated into the holding tool H or may be mounted to a surface of the holding tool H. The tool wireless tag 200 may be integrated with the tool communication apparatus 100.

The product wireless tag 300 is a wireless tag provided on the product P. A product identifier indicating the product P is written into the product wireless tag 300. The product wireless tag 300 may be mounted to a surface of the product P or may be affixed to a label mounted to the product P.

The display zone communication apparatus 400 is a communication apparatus provided in the display zone Z. The display zone communication apparatus 400 may be incorporated into the display zone Z or mounted to a surface of the display zone Z. The display zone communication apparatus 400 includes a wireless tag reader 420 for reading the product identifier from the product wireless tag 300 and reading the tool identifier from the tool wireless tag 200. The display zone communication apparatus 400 is connected to a network NW via a wired line or a wireless line and communicates with the product management apparatus 700 via the network NW.

The beacon transmission apparatus 500 is an apparatus provided in equipment E present in the store S, and constantly transmitting a beacon by the equipment E. The beacon refers to a signal that includes an identifier. In the following, an example in which a plurality of pieces of the equipment E is present in the store S will be mainly described, but one piece of the equipment E may be present in the store S. The plurality of pieces of equipment E is, for example, a full-length mirror (stand mirror) and a fitting room. By transmitting a different beacon for each equipment E, the beacon may be utilized as position information indicating a position in the store S.

The user communication apparatus 600 is a communication apparatus carried by a user. The user refers to a person utilizing the product management system 1, and is for example. a customer who may purchase the product P in the store S. The user communication apparatus 600 is connected to the network NW via the wireless line and communicates with the product management apparatus 700 via the network NW. The user communication apparatus 600 is a portable communication apparatus, and is for example. a smart phone, a tablet terminal, or a wearable terminal. It is assumed that a program for the product management system 1 is installed in the user communication apparatus 600.

A product management apparatus 700 is an apparatus for managing the product P. The product management apparatus 700 is connected to the network NW via the wired line or the wireless line and communicates with the display zone communication apparatus 400 and the user communication apparatus 600 via the network NW. In the following, an example in which the product management apparatus 700 is a server provided outside of the store S will be mainly described, but the product management apparatus 700 may be provided in the store S. The product management apparatus 700 does not necessarily have to be a dedicated server. The product management apparatus 700 may be a general-purpose PC having a product management program installed therein.

The product management apparatus 700 may be, for example, a server of a supplier of the display zone communication apparatus 400 or the tool communication apparatus 100, a server of an E-commerce dedicated site, or a server of a store dealer.

Example of Application Scenario of Product Management System

Figure 2:
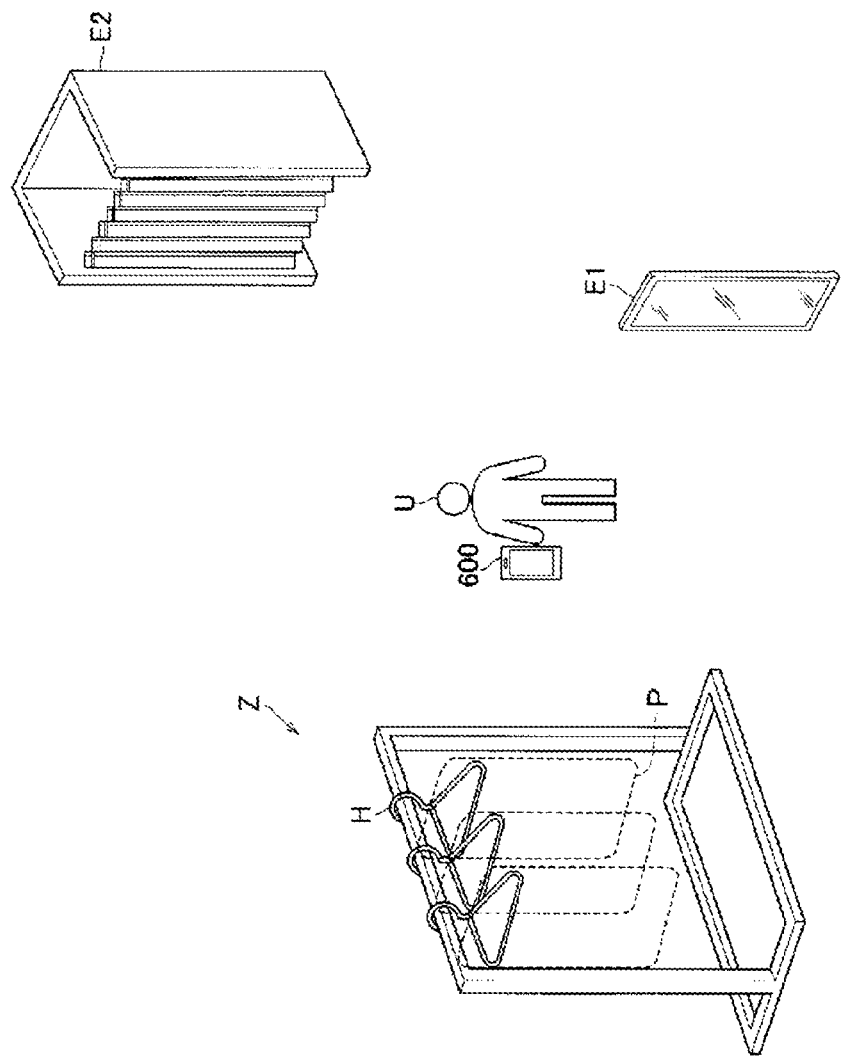
FIG. 2 a diagram illustrating an example of an application scenario of the product management system according to one embodiment.

Next, an example of an application scenario of the product management system 1 according to one embodiment will be described. FIG. 2 is a diagram illustrating an example of the application scenario of the product management system 1.

As illustrated in FIG. 2, a user U enters the store S carrying the user communication apparatus 600. The store S is provided with the display zone Z in which a plurality of sets of the product P and the holding tool H is disposed.

The user U selects a product P of interest from among the plurality of products P in the display zone Z, and takes out the selected product P and the corresponding holding tool H from the display zone Z. The user U moves to a full-length mirror E1 or a fitting room E2 while holding the product P and the corresponding holding tool H, and tries on the product P.

Although the user U is interested in the product P, the user U may return the product P to the display zone Z without purchasing the product P. The product management system 1 allows the user U interested in the product P and the product P in which the user U is interested to be identified, and provides beneficial information delivery to the user U interested in the product P.

The product management system 1 also allows for managing a correspondence relationship between the product P and the holding tool H, in other words, allows for automatically linking the product identifier and the tool identifier with each other, and reduces the burden accompanied by such a linking operation.

Configuration of Tool Communication Apparatus

Figure 3:
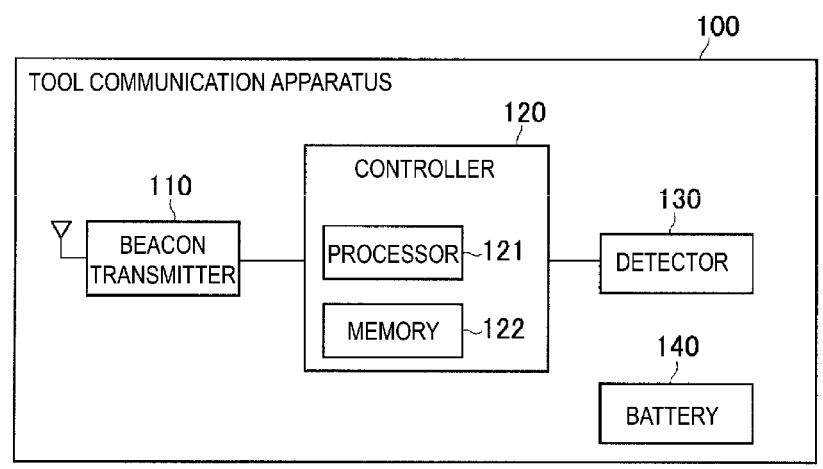
FIG. 3 is a diagram illustrating a configuration of a tool communication apparatus according to one embodiment.

Next, a configuration of the tool communication apparatus 100 according to one embodiment will be described. FIG. 3 is a diagram illustrating the configuration of the tool communication apparatus 100 according to one embodiment.

As illustrated in FIG. 3, the tool communication apparatus 100 includes a beacon transmitter 110, a controller 120, a detector 130, and a battery 140.

The beacon transmitter 110 transmits a beacon. In the following, an example will be mainly described in which the beacon is a BT beacon based on the Bluetooth (trade name, the same applies hereinafter) standard. However, the beacon is not limited to the BT beacon, and a beacon based on a standard other than the BT may be applied.

The controller 120 controls various functions of the tool communication apparatus 100. The controller 120 includes at least one memory 122, and at least one processor 121 electrically connected to the memory 122. The memory 122 includes a volatile memory and a non-volatile memory, and stores information used for processing in the processor 121 and a program executed by the processor 121. The processor 121 executes the program stored in the memory 122, thereby performing various processing. The memory 122 stores the tool identifier indicating the holding tool H on which the tool communication apparatus 100 is provided.

The detector 130 detects that the holding tool H has been taken out from the display zone Z and that the holding tool H has been returned to the display zone Z, and outputs a signal indicating the detection result to the controller 120. For example, the detector 130 may include a switch turning on/off in response to the holding tool H (hanger) being hung on the display zone Z (hanger rack) and/or a sensor sensing a change in the physical quantity (for example, mass, etc.) when the holding tool H (hanger) is hung on the display zone Z (hanger rack).

The battery 140 accumulates electrical power to be supplied to portions of the tool communication apparatus 100.

In the tool communication apparatus 100 configured in this manner, the controller 120 controls the beacon transmitter 110 to periodically transmit first notification information including the tool identifier indicating the holding tool H when the detector 130 detects that the holding tool H has been taken out from the display zone Z. The first notification information is notification information indicating a state in which the holding tool H is taken out from the display zone Z, in other words, a state in which the user U holds the holding tool H. Hereinafter, such first notification information is referred to as a beacon 1 (BT beacon 1).

The controller 120 controls the beacon transmitter 110 to stop the periodic transmission of the beacon 1 in a case where the detector 130 detects that the holding tool H has been returned to the display zone Z after the detector 130 detects that the holding tool H has been taken out from the display zone Z.

The controller 120 transmits second notification information indicating that the holding tool H has been returned to the display zone Z in the case where the detector 130 detects that the holding tool H has been returned to the display zone Z. The second notification information includes the tool identifier indicating the holding tool H. Hereinafter, such second notification information is referred to as a beacon 2 (BT beacon 2).

Figure 4:
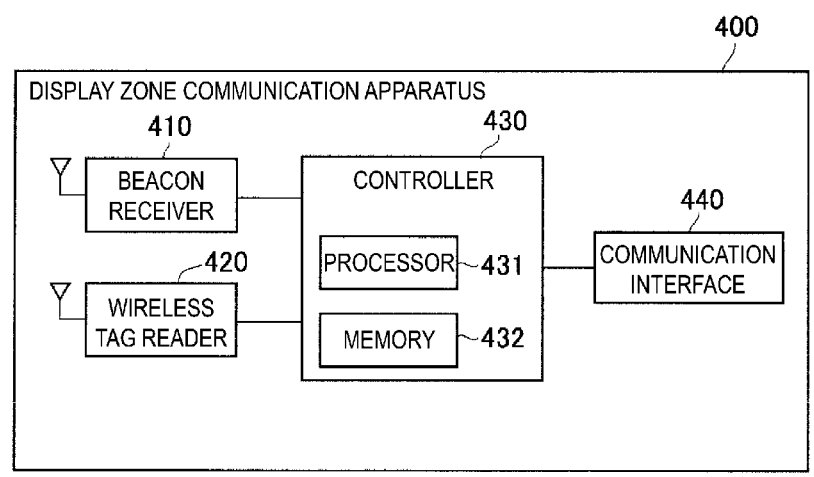
FIG. 4 is a diagram illustrating a configuration of a display zone communication apparatus according to one embodiment.

Configuration of Display Zone Communication Apparatus Next, a configuration of the display zone communication apparatus 400 according to one embodiment will be described. FIG. 4 is a diagram illustrating the configuration of the display zone communication apparatus 400 according to one embodiment.

As illustrated in FIG. 4, the display zone communication apparatus 400 includes a beacon receiver 410, a wireless tag reader 420, a controller 430, and a communication interface 440. The display zone communication apparatus 400 may include a battery or may be driven by power supply from a commercial power source.

The beacon receiver 410 receives beacons (beacon 1, and beacon 2) transmitted from the tool communication apparatus 100 and outputs the received beacons to the controller 430.

The wireless tag reader 420 reads the product identifier from the product wireless tag 300 and reads the tool identifier from the tool wireless tag 200 and outputs each read identifier to the controller 430.

The controller 430 controls various functions of the display zone communication apparatus 400. The controller 430 includes at least one memory 432, and at least one processor 431 electrically connected to the memory 432. The memory 432 includes a volatile memory and a non-volatile memory, and stores information used for processing in the processor 431 and a program executed by the processor 431. The processor 431 executes the program stored in the memory 432, thereby performing various processing.

The communication interface 440 is connected to the network NW via the wired line or the wireless line and communicates with the product management apparatus 700 via the network NW. In one embodiment, the communication interface 440 corresponds to a transmitter for transmitting both the product identifier and the tool identifier to the product management apparatus 700.

In the display zone communication apparatus 400 configured in this manner, the controller 430 controls the communication interface 440 to transmit both the product identifier and the tool identifier read by the wireless tag reader 420 to the product management apparatus 700.

When the beacon receiver 410 receives the beacon 1 from the tool communication apparatus 100, the controller 430 reads the product identifier and the tool identifier via the wireless tag reader 420. In other words, the controller 430 executes scanning (reading) by the wireless tag reader 420, using reception of the beacon 1 from the tool communication apparatus 100 as a trigger.

Furthermore, when the beacon receiver 410 receives the beacon 2 from the tool communication apparatus 100, the controller 430 reads the product identifier and the tool identifier via the wireless tag reader 420. In other words, the controller 430 executes scanning (reading) by the wireless tag reader 420, using reception of the beacon 2 from the tool communication apparatus 100 as a trigger.

Note that the trigger of the scanning is not limited to the reception of the beacons 1 and 2, and the scanning by the wireless tag reader 420 may be executed, using an operation of a store clerk as the trigger.

The controller 430 reads the product identifier and the tool identifier at a first read timing, and thereafter reads the product identifier and the tool identifier at a second read timing. In a case where the controller 430 determines that the number of the product identifiers and the tool identifiers read at the second read timing has changed relative to the number of product identifiers and the tool identifiers read at the first read timing, the controller 430 controls the communication interface 440 to transmit the product identifiers and the tool identifiers read at the second read timing to the product management apparatus 700. In this manner, the controller 430 identifies and manages the identifier of each product P and the identifier of each holding tool H present in the display zone Z, and transmits the managed identifier to the product management apparatus 700, using an occurrence of a change in the number of the managed identifiers as a trigger.

Configuration of User Communication Apparatus

Figure 5:
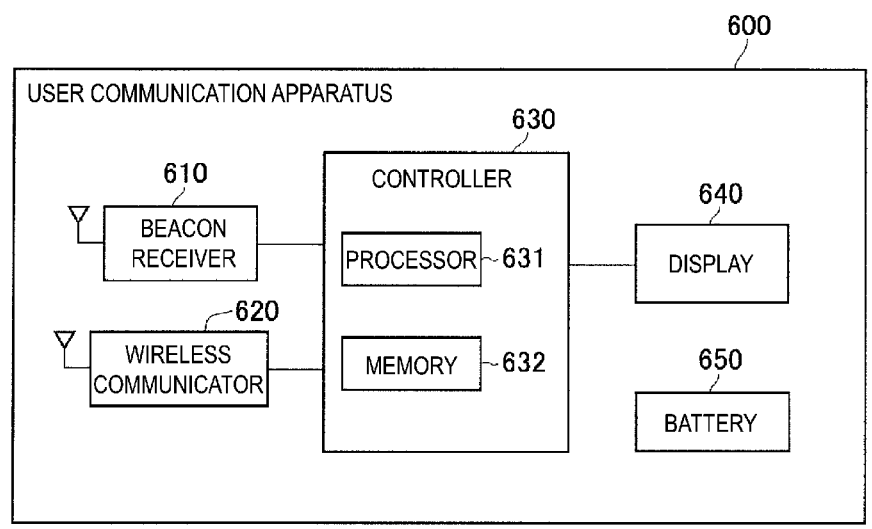
FIG. 5 is a diagram illustrating a configuration of a user communication apparatus according to one embodiment.

Next, a configuration of the user communication apparatus 600 according to one embodiment will be described. FIG. 5 is a diagram illustrating the configuration of the user communication apparatus 600 according to one embodiment.

As illustrated in FIG. 5, the user communication apparatus 600 includes a beacon receiver 610, a wireless communicator 620, a controller 630, a display 640, and a battery 650.

The beacon receiver 610 receives a beacon from the tool communication apparatus 100 and the beacon transmission apparatus 500, and outputs the received beacon to the controller 630. In one embodiment, the beacon receiver 610 corresponds to a receiver for receiving the beacon 1 including the tool identifier indicating the holding tool H from tool communication apparatus 100.

The wireless communicator 620 is connected to the network NW via the wireless line and communicates with the product management apparatus 700 via the network NW. For example, the wireless communicator 620 includes a cellular communication interface. In one embodiment, the wireless communicator 620 corresponds to a transmitter for transmitting the beacon 1 received by the receiver and a user identifier indicating the user U or the user communication apparatus 600 to the product management apparatus 700.

The controller 630 controls various functions of the user communication apparatus 600. The controller 630 includes at least one memory 632, and at least one processor 631 electrically connected to the memory 632. The memory 632 includes a volatile memory and a non-volatile memory, and stores information used for processing in the processor 631 and a program executed by the processor 631. The processor 631 executes the program stored in the memory 632, thereby performing various processing. The memory 632 stores the user identifier indicating the user U or the user communication apparatus 600.

The display 640 displays various information under control of the controller 630.

The battery 650 accumulates electrical power to be supplied to each portion of the user communication apparatus 600.

In the user communication apparatus 600 configured in this manner, the controller 630 controls the wireless communicator 620 to periodically transmit a beacon (identifier) received by the beacon receiver 610 together with the user identifier to the product management apparatus 700.

For example, the controller 630 controls the wireless communicator 620 to transmit the user identifier and the beacon 1 (tool identifier) to the product management apparatus 700 after the beacon receiver 610 receives the beacon 1 (tool identifier) from the tool communication apparatus 100. In this way, the product management apparatus 700 can identify the holding tool H corresponding to the product P held by the user U and the user U.

The controller 630 controls the wireless communicator 620 to periodically transmit the beacon 1 to the product management apparatus 700 in a period in which the beacon receiver 610 periodically receives the beacon 1 from the tool communication apparatus 100. In this way, the product management apparatus 700 can identify (estimate) a period in which the user U holds the product P.

In a case where the beacon receiver 610 receives the beacon 2 (tool identifier) from the tool communication apparatus 100, the controller 630 controls the wireless communicator 620 to transmit the user identifier and the beacon 2 (tool identifier) to the product management apparatus 700. In this way, the product management apparatus 700 can identify that the user U has returned the product P to the display zone Z.

In a case where position information indicating a position of the user communication apparatus 600 in the store S in other words, the beacon transmitted from the beacon transmission apparatus 500 is obtained, the controller 630 controls the wireless communicator 620 to transmit the obtained position information (beacon) to the product management apparatus 700. In this way, the product management apparatus 700 can identify a movement destination of the user U in the store S.

Figure 6:
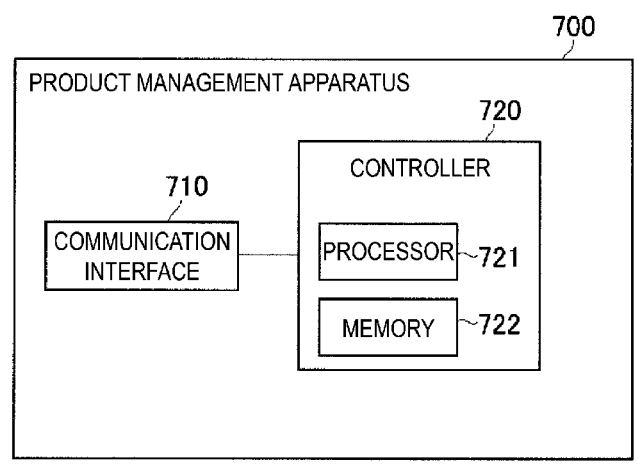
FIG. 6 is a diagram illustrating a configuration of a product management apparatus according to one embodiment.

Configuration of Product Management Apparatus Next, a configuration of the product management apparatus 700 according to one embodiment will be described. FIG. 6 is a diagram illustrating the configuration of the product management apparatus 700 according to one embodiment.

As illustrated in FIG. 6, the product management apparatus 700 includes a communication interface 710 and a controller 720.

The communication interface 710 is connected to the network NW via the wired line or the wireless line and communicates with the display zone communication apparatus 400 and the user communication apparatus 600 via the network NW. In one embodiment, the communication interface 710 corresponds to a receiver for receiving, from the display zone communication apparatus 400, the product identifier and the tool identifier read from the product wireless tag 300 and the tool wireless tag 200, respectively. The communication interface 710 corresponds to a receiver for receiving, from the user communication apparatus 600, the beacon and the user identifier received by the user communication apparatus 600 from the tool communication apparatus 100.

The controller 720 controls various functions of the product management apparatus 700. The controller 720 includes at least one memory 722, and at least one processor 721 electrically connected to the memory 722. The memory 722 includes a volatile memory and a non-volatile memory, and stores information used for processing in the processor 721 and a program executed by the processor 721. The processor 721 executes the program stored in the memory 722, thereby performing various processing. The memory 722 stores user information concerning the user U. The user information may include information about the product P that the user U has previously purchased or indicated interest in, and/or information indicating preferences of the user U for the product.

In the product management apparatus 700 configured in this manner, the controller 720 links the holding tool H and the product P held by the holding tool H with each other based on the product identifier and the tool identifier received by the communication interface 710 from the display zone communication apparatus 400.

For example, the controller 720 receives the product identifier and the tool identifier from the display zone communication apparatus 400 at a first reception timing, and thereafter receives the product identifier and the tool identifier from the display zone communication apparatus 400 at a second reception timing. In a case where the number of the product identifiers and the tool identifiers received at the second reception timing has changed relative to the number of product identifiers and the tool identifiers received at the first reception timing, the controller 720 identifies the product identifiers and the tool identifiers corresponding to the change, and links and stores the identified product identifiers and tool identifiers with each other.

In this way, the controller 720 can automatically manage a correspondence relationship between the product P and the holding tool H, in other words, the controller 720 can automatically link the product identifier and the tool identifier with each other.

On the other hand, the controller 720 identifies the user U who has taken out the holding tool H from the display zone Z based on the user identifier received by the communication interface 710 from the user communication apparatus 600. The controller 720 also identifies the product P held by the holding tool H taken out by the user U based on the product identifier linked with the beacon 1 (tool identifier) received by the communication interface 710, from the user communication apparatus 600. In this way, the controller 720 can identify the user U interested in the product P and the product P in which the user U is interested.

The controller 720 controls the communication interface 710 to transmit the product information concerning the identified product P to the user communication apparatus 600 of the identified user U. In this way, beneficial information concerning the product P in which the user U is interested can be provided to the user U.

The controller 720 estimates a period in which the user U holds the holding tool H and the product P based on at least the beacon 1 from the user communication apparatus 600, and estimates a degree of interest of the user U with respect to the product P based on the estimated period. The controller 720 also identifies that the user U has returned the product P and the holding tool H to the display zone Z based on the beacon 2 from the user communication apparatus 600. The controller 720 may determine that the longer the period in which the user U holds the holding tool H and the product P, the higher the degree of interest of the user U with respect to the product P.

The controller 720 also identifies a movement destination of the user communication apparatus 600 within the estimated period (in other words, a period in which the user U holds the holding tool H and the product P) based on the beacon (position information) received by the user communication apparatus 600 from the beacon transmission apparatus 500. Then, the controller 720 estimates the degree of interest of the user U with respect to the product P based on the identified movement destination. In this way, detailed information according to the degree of interest of the user U can be delivered.

For example, the controller 720 determines that 1) the user U has taken out the product P from the display zone Z and returned the product P to the display zone Z immediately, 2) the user U has moved to the full-length mirror E1 while holding the product P, and 3) the user U has moved to the fitting room E2 while holding the product P. The controller 720 estimates the degree of interest of the user U with respect to the product P for each of 1) to 3). Specifically, it can be estimated that the degree of interest in the case of 3) is the highest and the degree of interest in the case of 1) is the lowest among the cases of 1) to 3).

The controller 720 determines a type of the product information, which is information concerning the product P, to be transmitted to the user communication apparatus 600 of the user U (in other words, the type of information to be provided to the user U) based on the estimated degree of interest.

For example, in a case where it is determined that 1) the user U has taken out the product P from the display zone Z and returned the product P to the display zone Z immediately, the controller 720 provides the following information to the user U.

Product inventory information for different colors or different sizes of the product P.

Price of the product P.

Information displayed on the tag, such as the size, the material, laundry symbols, and the production site of the product P.

Best-selling ranking information such as whether the product P is popular.

Information indicating a matching probability with clothes or the like owned by the user U.

In a case where it is determined that 2) the user U has moved to the full-length mirror E1 while holding the product P, the controller 720 provides the following information to the user U.

Coordination information by other users who purchased the same product P.

Information indicating a store clerk more familiar with the product P (the user U can be served by designating and calling that store clerk).

Thoughts from the designer on the product P.

Display a detailed matching probability with owned clothes or the like and a reason therefor.

Proposal of information about other products matching with product P from a stylist.

In a case where it is determined that 3) the user U has moved to the fitting room E2 while holding the product P, the controller 720 provides the following information to the user U.

Size information. Inventory information about different sizes is provided when the user U entered the fitting room but did not purchase, since the size may not have matched.

Product information about different colors.

Information about the product P brought into the fitting room.

Information about the store clerk who served the user.

Information about a nearby cafe when the time from entry to the store is long.

Information about whether this suits the family of the user U when the user U has purchased the product P.

Information on how to care for the product P (for example, in a case of a cowhide bag) and product information.

User review information about the product P held.

Information about a company to which the present service is associated. Information such as, information about nearby fitness clubs, information about restaurants, information related to images of the clothes such as books or groceries, music, and movies, or information such as someone wore the clothes in a television show.

The relationship between the estimated degree of interest and the type of product information is not limited to the above. For example, in a case where the user U takes out the product P from the display zone Z and returns the product P to the display zone Z immediately, the user U may be provided with coordination information by other users who purchased the same product P to the user communication apparatus 600.

In a case where recommended information matching with a preference of the user U, such as the coordination information described above, is displayed on the user communication apparatus 600 based on the product P1 picked up by the user U, for example, when a person who picked up or purchased the product P1 also often picked up or purchased a product P2, the product management apparatus 700 may determine the product P2 as the recommended information for the person who has picked up the product P1 (determination method 1 of the recommended information). Also, for example, for the user U who has picked up the product P1, the product management apparatus 700 may determine the product P2 included in a category in which the product P1 is classified as recommended information (determination method 2 of the recommended information). The determination method 1 of the recommended information and the determination method 2 of the recommended information described above may be combined, or other determination methods of the recommended information may be combined.

Operations in Product Management System

Next, operations in the product management system 1 according to one embodiment will be described.

(1) Operations when Displaying Product

Figure 7:
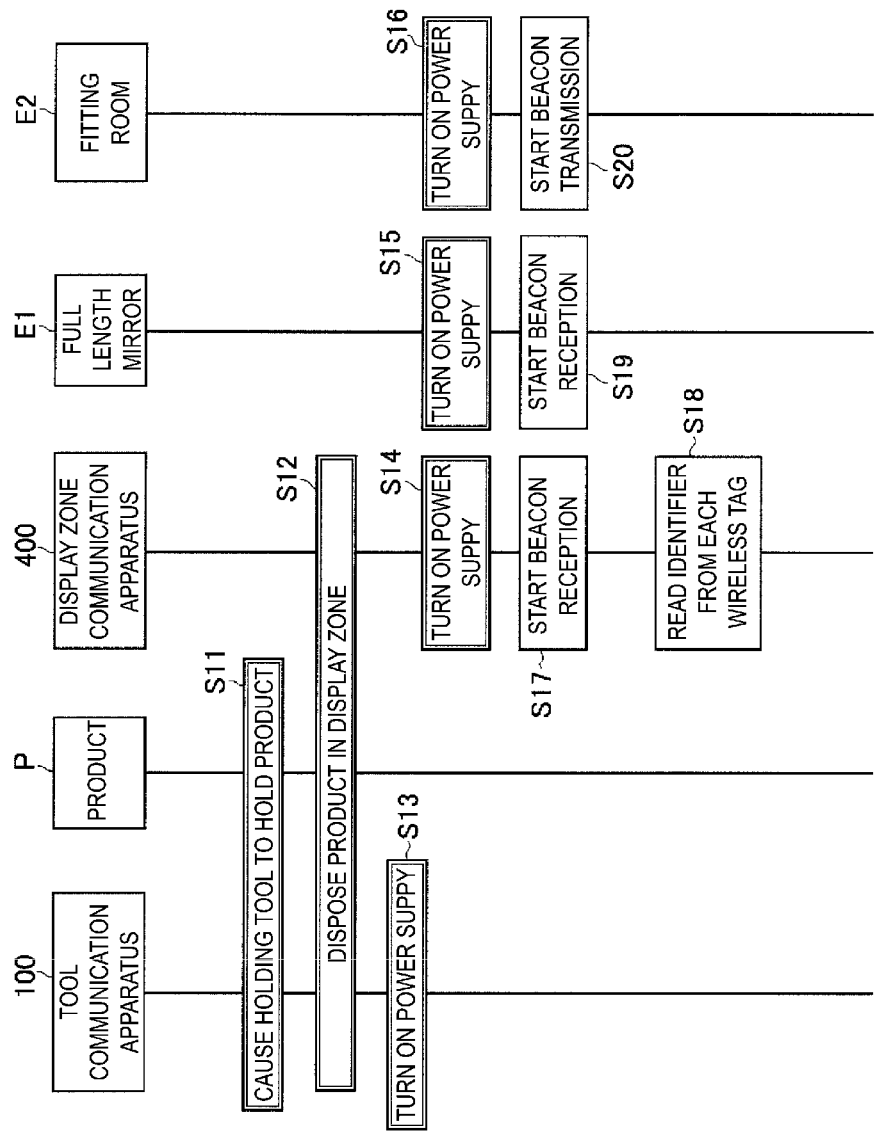
FIG. 7 is a diagram illustrating operations performed in the product management system according to one embodiment when a product is displayed.

FIG. 7 is a diagram illustrating operations performed in the product management system 1 according to one embodiment when the product P is displayed.

As illustrated in FIG. 7, in step S11, the store clerk of the store S causes the holding tool H to hold the product P.

In step S12, the store clerk of the store S disposes at least one set of the product P and the holding tool H in the display zone Z. Then, the store clerk in the store S turns on the power supply of the tool communication apparatus 100 (step S13), turns on the power supply of the display zone communication apparatus 400 (step S14), turns on the power supply of the beacon transmission apparatus 500 provided on the full-length mirror E1 (step S15), and turns on the power supply of the beacon transmission apparatus 500 provided in the fitting room E2 (step S16).

In step S17, the controller 430 of the display zone communication apparatus 400, when the power supply thereof is turned on, controls the beacon receiver 410 to start a beacon reception operation.

In step S18, the controller 430 of the display zone communication apparatus 400 controls the wireless tag reader 420 to read the identifier (tool identifier) of each tool wireless tag 200 and the identifier (product identifier) of each product wireless tag 300 present in the display zone Z and stores each read identifier. The controller 430 of the display zone communication apparatus 400 may control the communication interface 440 to transmit each read identifier to the product management apparatus 700.

In step S19, the beacon transmission apparatus 500 provided on the full-length mirror E1, when the power supply thereof is turned on, starts beacon transmission at a transmission electrical power configured to reach only the vicinity of the full-length mirror E1.

In step S20, the beacon transmission apparatus 500 provided in the fitting room E2, when the power supply thereof is turned on, starts beacon transmission at a transmission electrical power configured to reach only the vicinity of the fitting room E2.

(2) Operations when Selecting Product after Entering Store

Figure 8:
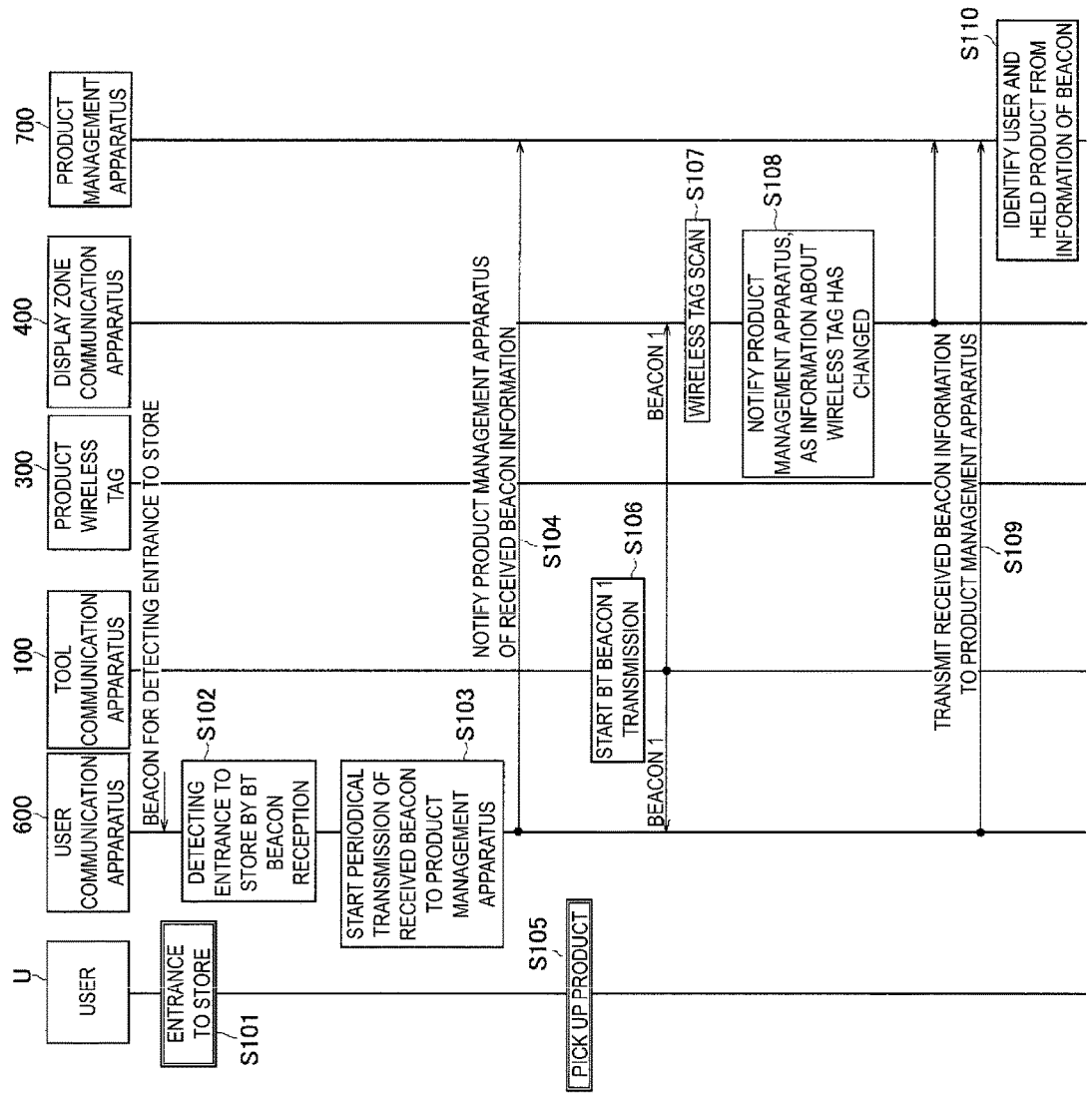
FIG. 8 is a diagram illustrating operations performed in the product management system according to one embodiment when a user selects a product after entering a store.

FIG. 8 is a diagram illustrating operations performed in the product management system 1 according to one embodiment when the user U selects the product P after entering the store.

As illustrated in FIG. 8, in step S101, the user U enters the store S.

In step S102, the beacon receiver 610 of the user communication apparatus 600 receives a beacon from the beacon transmission apparatus 500 provided near the entrance of the store S. The controller 630 of the user communication apparatus 600 detects the entrance of the user U to the store S in response to the reception of the beacon, and starts the application of the present service.

In step S103, the controller 630 of the user communication apparatus 600 starts regular transmission of the received beacon to the product management apparatus 700.

In step S104, the controller 630 of the user communication apparatus 600 controls the wireless communicator 620 to transmit the beacon received in step S102 and the user identifier to the product management apparatus 700. The controller 720 of the product management apparatus 700 determines that the user U has entered the store S based on the beacon and the user identifier, from the user communication apparatus 600.

In step S105, the user U selects a set of the product P and the holding tool H disposed in the display zone Z, and takes out (picks up) the set from the display zone Z.

In step S106, the detector 130 of the tool communication apparatus 100 of the holding tool H taken out from the display zone Z detects that the holding tool H has been taken out from the display zone Z. When the detector 130 detects that the holding tool H has been taken out from the display zone Z, the controller 120 of the tool communication apparatus 100 controls the beacon transmitter 110 to start a periodic transmission of the beacon 1 (BT beacon 1).

The beacon receiver 610 of the user communication apparatus 600 receives the beacon 1 from the tool communication apparatus 100. The beacon receiver 410 of the display zone communication apparatus 400 also receives the beacon 1 from the tool communication apparatus 100.

In step S107, the controller 430 of the display zone communication apparatus 400 controls the wireless tag reader 420 to read the identifier (tool identifier) of each tool wireless tag 200 and the identifier (product identifier) of each product wireless tag 300 present in the display zone Z in response to the reception of the beacon 1. Then, the controller 430 of the display zone communication apparatus 400 compares each identifier newly read to each identifier already stored, thereby detecting a change. Specifically, since the user U has taken out the set of the product P and the holding tool H from the display zone Z, the identifiers newly read are decreased than the identifiers already stored.

In step S108, the controller 430 of the display zone communication apparatus 400, controls the communication interface 440 to transmit each identifier newly read to the product management apparatus 700 in response to the decrease in the identifiers newly read than the identifiers already stored. The controller 430 of the display zone communication apparatus 400 overwrites each identifier already stored with each identifier newly read.

The communication interface 710 of the product management apparatus 700 receives each identifier newly read from the display zone communication apparatus 400. The controller 720 of the product management apparatus 700 compares each identifier newly read to each identifier already stored, thereby determining that the identifiers newly read is decreased than the identifiers already stored. The controller 720 of the product management apparatus 700 identifies the combination of the identifiers (the product identifier and the tool identifier) corresponding to the decrease as the set of the product P and the holding tool H held by the user U.

Alternatively, in step S108, the controller 430 of the display zone communication apparatus 400, may control the communication interface 440 to transmit the identifiers (the product identifier and the tool identifier) corresponding to the decrease to the product management apparatus 700 in response to the decrease in the identifiers newly read than the identifiers already stored.

Under such assumptions, the communication interface 710 of the product management apparatus 700 receives the identifiers (the product identifier and the tool identifier) corresponding to the decrease from the display zone communication apparatus 400. The controller 720 of the product management apparatus 700 identifies the combination of the identifiers (the product identifier and the tool identifier) received by the communication interface 710 as the set of the product P and the holding tool H held by the user U.

In step S109, the controller 630 of the user communication apparatus 600 controls the wireless communicator 620 to transmit the beacon 1 (tool identifier) received from the tool communication apparatus 100 in step S106 and the user identifier to the product management apparatus 700. The communication interface 710 of the product management apparatus 700 receives the beacon 1 (tool identifier) and the user identifier, from the user communication apparatus 600.

In step S110, the controller 720 of the product management apparatus 700 identifies the user U based on the user identifier from the user communication apparatus 600, and identifies the holding tool H held by the user U based on the beacon 1 (tool identifier) from the user communication apparatus 600. Then, the controller 720 of the product management apparatus 700 identifies the product P (product identifier) linked with the identified holding tool H as the product P held by the user U.

(3) Operations when Moving after Selecting Product

Figure 9:
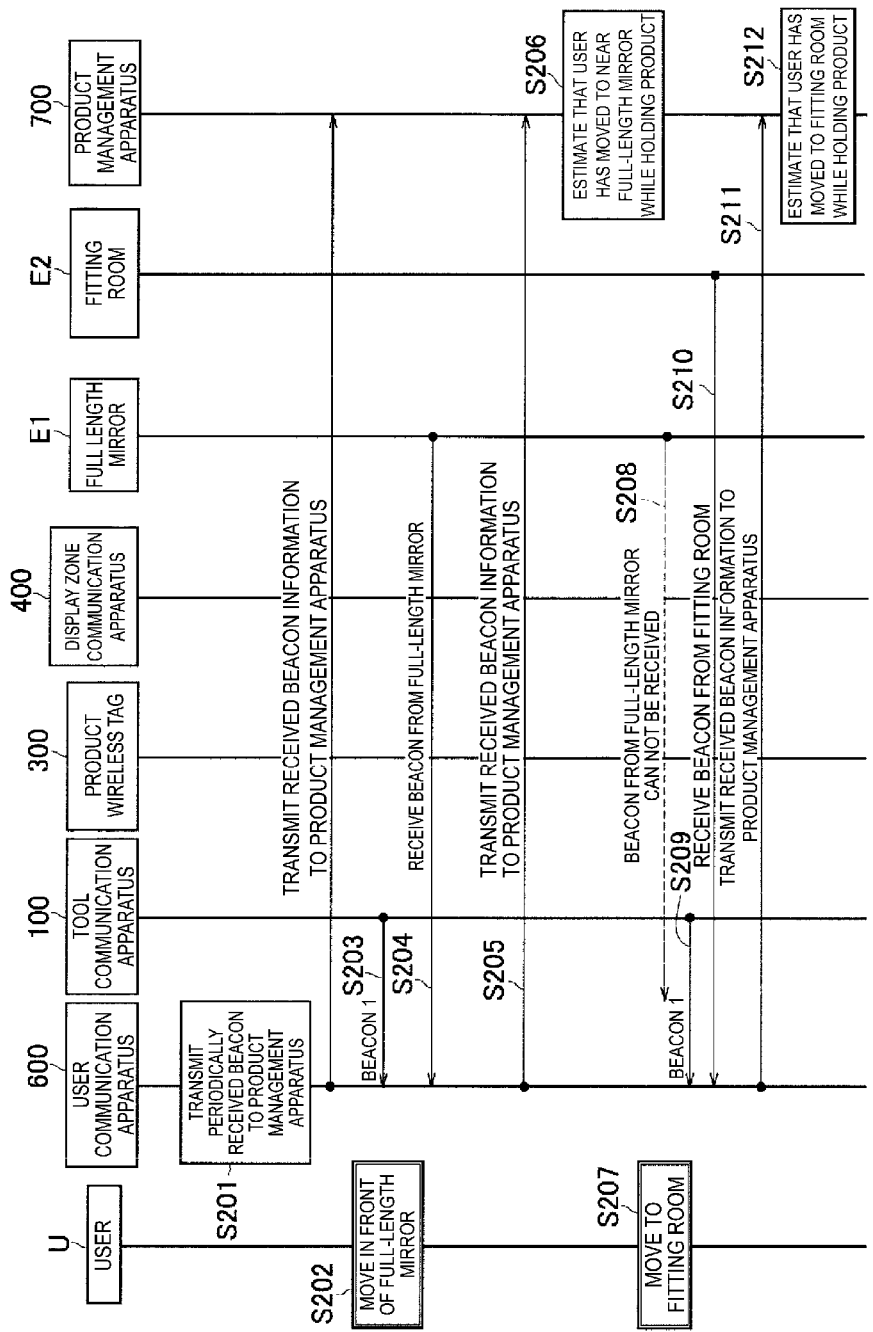
FIG. 9 is a diagram illustrating operations performed in the product management system according to one embodiment when the user moves in the store after selecting the product.

FIG. 9 is a diagram illustrating operations performed in the product management system 1 according to one embodiment when the user U moves in the store S after selecting the product P.

As illustrated in FIG. 9, in step S201, the controller 630 of the user communication apparatus 600 continues the regular transmission of the received beacon to the product management apparatus 700.

In step S202, the user U moves in front of the full-length mirror E1 while holding the product P.

In step S203, beacon receiver 610 of user communication apparatus 600 receives beacon 1 from tool communication apparatus 100.

In step S204, the beacon receiver 610 of the user communication apparatus 600 receives the beacon (position information indicating the full-length mirror E1) from the beacon transmission apparatus 500 provided on the full-length mirror E1.

In step S205, the controller 630 of the user communication apparatus 600 controls the wireless communicator 620 to transmit the beacon 1 (tool identifier) received from the tool communication apparatus 100 in step S203, the beacon (position information indicating the full-length mirror E1) received from the beacon transmission apparatus 500 in step S204, and the user identifier to the product management apparatus 700. The communication interface 710 of the product management apparatus 700 receives the beacon 1 (tool identifier), the beacon (position information indicating the full-length mirror E1), and the user identifier, from the user communication apparatus 600.

In step S206, the controller 720 of the product management apparatus 700 estimates that the user U has moved close to the full-length mirror E1 while holding the product P based on the beacon 1 (tool identifier), the beacon (position information indicating the full-length mirror E1), and the user identifier, from the user communication apparatus 600.

In step S207, the user U moves in front of the fitting room E2 while holding the product P.

In step S208, since the user U is away from the full-length mirror E1, the beacon receiver 610 of the user communication apparatus 600 is unable to receive the beacon from the beacon transmission apparatus 500 provided on the full-length mirror E1.

In step S209, the beacon receiver 610 of the user communication apparatus 600 receives the beacon 1 from the tool communication apparatus 100.

In step S210, the beacon receiver 610 of the user communication apparatus 600 receives the beacon (position information indicating the fitting room E2) from the beacon transmission apparatus 500 provided in the fitting room E2.

In step S211, the controller 630 of the user communication apparatus 600 controls the wireless communicator 620 to transmit the beacon 1 (tool identifier) received from the tool communication apparatus 100 in step S209, the beacon (position information indicating the fitting room E2) received from the beacon transmission apparatus 500 in step S210, and the user identifier to the product management apparatus 700. The communication interface 710 of the product management apparatus 700 receives the beacon 1 (tool identifier), the beacon (position information indicating the fitting room E2), and the user identifier, from the user communication apparatus 600.

In step S212, the controller 720 of the product management apparatus 700 estimates that the user U has moved to the fitting room E2 while holding the product P based on the beacon 1 (tool identifier), the beacon (position information indicating the fitting room E2), and the user identifier, from the user communication apparatus 600.

(4) Operation when Returning Product

Figure 10:
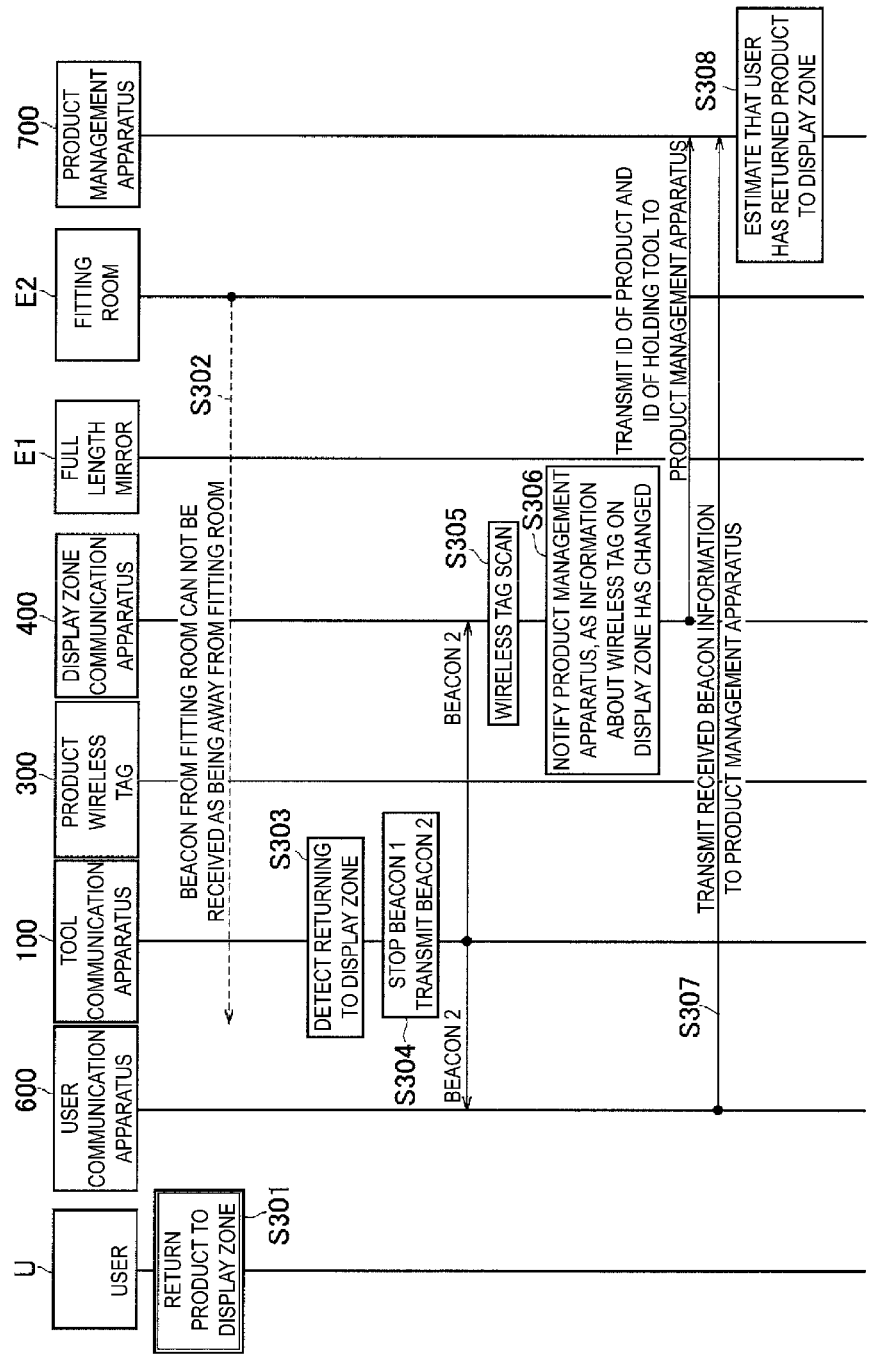
FIG. 10 is a diagram illustrating operations performed in the product management system according to one embodiment when the user returns the product to the display zone after moving in the store.

FIG. 10 is a diagram illustrating operations performed in the product management system 1 according to one embodiment when the user U returns the product P to the display zone Z after moving in the store S.

As illustrated in FIG. 10, in step S301, the user U returns the set of the product P and the holding tool H to the display zone Z.

In step S302, since the user U is away from the fitting room E2, the beacon receiver 610 of the user communication apparatus 600 is unable to receive the beacon from the beacon transmission apparatus 500 provided in the fitting room E2.

In step S303, the detector 130 of the tool communication apparatus 100 detects that the holding tool H has been returned to the display zone Z.

In step S304, the controller 120 of the tool communication apparatus 100 controls the beacon transmitter 110 to stop the periodic transmission of the beacon 1 and transmit the beacon 2 in response to the detector 130 detecting that the holding tool H has been returned to the display zone Z. The transmission of the beacon 2 may be one, or may be a plurality of transmissions in order to improve reliability.

The beacon receiver 610 of the user communication apparatus 600 receives the beacon 2 from the tool communication apparatus 100. The beacon receiver 410 of the display zone communication apparatus 400 also receives the beacon 2 from the tool communication apparatus 100.

In step S305, the controller 430 of the display zone communication apparatus 400 controls the wireless tag reader 420 to read the identifier (tool identifier) of each tool wireless tag 200 and the identifier (product identifier) of each product wireless tag 300 present in the display zone Z in response to the reception of the beacon 2 by the beacon receiver 410. Then, the controller 430 of the display zone communication apparatus 400 compares each identifier newly read to each identifier already stored, thereby detecting a change. Specifically, since the user U has returned the set of the product P and the holding tool H to the display zone Z, the identifiers newly read are increased than the identifiers already stored.

In step S306, the controller 430 of the display zone communication apparatus 400, controls the communication interface 440 to transmit each identifier newly read to the product management apparatus 700 in response to the increase in the identifiers newly read than the identifiers already stored.

The communication interface 710 of the product management apparatus 700 receives each identifier newly read from the display zone communication apparatus 400. The controller 720 of the product management apparatus 700 compares each identifier newly read to each identifier already stored, thereby determining that the identifiers newly read are increased than the identifiers already stored. The controller 720 of the product management apparatus 700 identifies the combination of the identifiers (the product identifier and the tool identifier) corresponding to the increase as the set of the product P and the holding tool H returned to the display zone Z by the user U.

Alternatively, in step S306, the controller 430 of the display zone communication apparatus 400, may control the communication interface 440 to transmit the identifiers (the product identifier and the tool identifier) corresponding to the increase to the product management apparatus 700 in response to the increase in the identifiers newly read than the identifiers already stored.

Under such assumptions, the communication interface 710 of the product management apparatus 700 receives the identifiers (the product identifier and the tool identifier) corresponding to the increase from the display zone communication apparatus 400. The controller 720 of the product management apparatus 700 identifies the combination of the identifiers (the product identifier and the tool identifier) received by the communication interface 710 as the set of the product P and the holding tool H returned to the display zone Z by the user U.

In step S307, the controller 630 of the user communication apparatus 600 controls the wireless communicator 620 to transmit the beacon 2 (tool identifier) received from the tool communication apparatus 100 in step S304 and the user identifier to the product management apparatus 700. The communication interface 710 of the product management apparatus 700 receives the beacon 2 (tool identifier) and the user identifier, from the user communication apparatus 600.

In step S308, the controller 720 of the product management apparatus 700 identifies the user U based on the user identifier from the user communication apparatus 600, and identifies the holding tool H returned to the display zone Z by the user U based on the beacon 2 (tool identifier) from the user communication apparatus 600. Then, the controller 720 of the product management apparatus 700 identifies the product P (product identifier) linked with the identified holding tool H as the product P returned to the display zone Z by the user U.

Figure 11C:
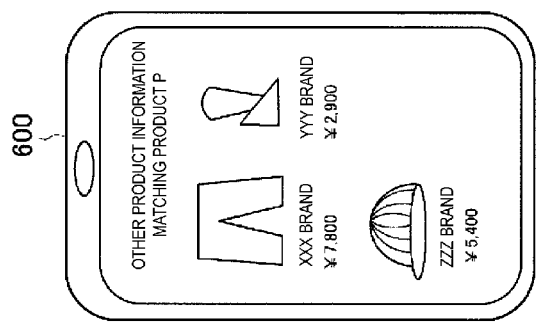
FIGS. 11A, 11B and 11C are a diagram illustrating an example of displaying information concerning the product on a user communication apparatus according to one embodiment.
Figure 11B:
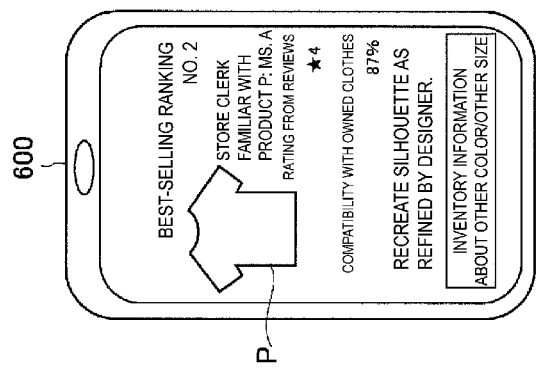
Figure 11A:
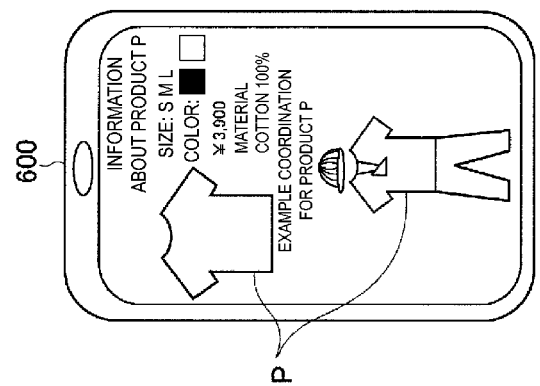

Example when Displaying Information Concerning Product on User Communication Apparatus Next, an example of displaying information concerning the product P on the user communication apparatus 600 according to one embodiment will be described. FIG. 11A, FIG. 11B, and FIG. 11C are diagrams illustrating examples of displaying information concerning the product P on the user communication apparatus 600.

As illustrated in FIG. 11A, FIG. 11B, and FIG. 11C, in a case where the controller 720 determines that 1) the user U has taken out the product P from the display zone Z and returned the product P to the display zone Z immediately, 2) the user U has moved to the full-length mirror E1 while holding the product P, or 3) the user U has moved to the fitting room E2 while holding the product P, the user communication apparatus 600 receives and displays information concerning the product P from the product management apparatus 700.

Example of Communication of a Plurality of Product Management Apparatuses Included in Product Management Apparatus and User Communication Apparatus Next, an example of communication of a plurality of the product management apparatuses included in the product management apparatus 700 and the user communication apparatus 600 according to one embodiment.

The product management apparatus 700 may include a plurality of the product management apparatuses. The plurality of product management apparatuses may include, for example, a first product management apparatus 723, a second product management apparatus 724, and a third product management apparatus 725. The first product management apparatus 723 may be a server of a supplier of the display zone communication apparatus 400 or the tool communication apparatus 100, and the second product management apparatus 724 and the third product management apparatus 725 may be servers of an E-commerce dedicated site, or servers of a store dealer. The first product management apparatus 723, the second product management apparatus 724, and the third product management apparatus 725 are connected to the network NW via the wired line or the wireless line and communicate via the network NW.

FIG. 12A and FIG. 12B are diagrams illustrating examples of communication of the plurality of product management apparatuses included in the product management apparatus 700 and the user communication apparatus 600. For example, in a case where the product management apparatus 700 includes the first product management apparatus 723 and the second product management apparatus 724, the first product management apparatus 723 may transmit the information about the product to the second product management apparatus 724, and the second product management apparatus 724 may transmit the information concerning the product P to the first product management apparatus 723, and thereafter the first product management apparatus 723 may transmit the information concerning the product P to the user communication apparatus 600 (FIG. 12A). For example, the first product management apparatus 723 transmits the information about the product P to the second product management apparatus 724, and thereafter the second product management apparatus 724 may transmit information concerning the product P to the user communication apparatus 600 (FIG. 12B).

Figure 13:
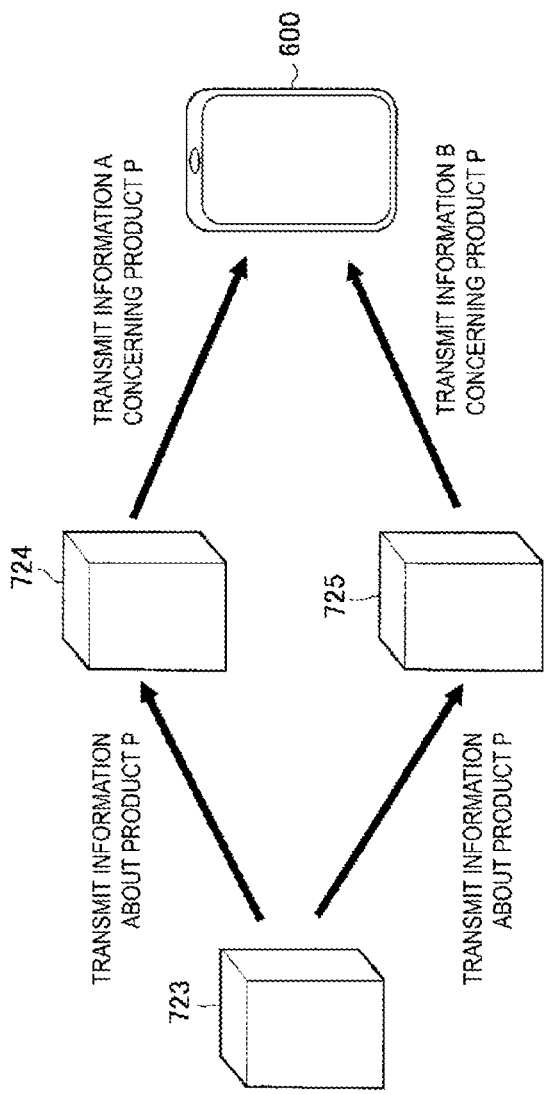
FIG. 13 is a diagram illustrating an example of communication between the plurality of product management apparatuses included in the product management apparatus and the user communication apparatus according to one embodiment.

FIG. 13 is a diagram illustrating an example of communication of the plurality of product management apparatuses included in the product management apparatus 700 and the user communication apparatus 600. For example, in a case where the product management apparatus 700 includes the first product management apparatus 723, the second product management apparatus 724, and the third product management apparatus 725, the first product management apparatus 723 may transmit information about the product P to the second product management apparatus 724 and the third product management apparatus 725, and each of the second product management apparatus 724 and the third product management apparatus 725 may transmit different information concerning the product P to the user communication apparatus 600.

Other Embodiments

A program that causes a computer to execute each of the processing operations described above may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Embodiments have been described above in detail with reference to the drawings, but specific configurations are not limited to those described above, and various design modifications can be made without departing from the gist of the present disclosure.

The invention claimed is:

1. A product management system comprising:
a product management apparatus configured to manage a product;
a product wireless tag provided on the product and into which a product identifier indicating the product is written;
a tool wireless tag provided on a holding tool and into which a tool identifier indicating the holding tool is written, the holding tool being configured to hold the product; and
a display zone communication apparatus provided in a display zone in which at least one set of the product and the holding tool is disposed and including a wireless tag reader configured to read the product identifier from the product wireless tag and read the tool identifier from the tool wireless tag,
wherein the display zone communication apparatus transmits both the product identifier and the tool identifier read by the wireless tag reader to the product management apparatus, and
the product management apparatus links the holding tool and the product held by the holding tool with each other based on the product identifier and the tool identifier from the display zone communication apparatus.

2. The product management system according to claim 1, wherein the product management apparatus receives the product identifier and the tool identifier from the display zone communication apparatus at a first reception timing, and thereafter receives the product identifier and the tool identifier from the display zone communication apparatus at a second reception timing, and
in a case where the number of the product identifiers and the tool identifiers received at the second reception timing has changed relative to the number of product identifiers and the tool identifiers received at the first reception timing, the product management apparatus identifies the product identifiers and the tool identifiers corresponding to the change, and links and stores the identified product identifiers and tool identifiers with each other.

3. The product management system according to claim 1, wherein the display zone communication apparatus reads the product identifier and the tool identifier at a first read timing, and thereafter reads the product identifier and the tool identifier at a second read timing, and
in a case of determining that the number of the product identifiers and the tool identifiers read at the second read timing has changed relative to the number of product identifiers and the tool identifiers read at the first read timing, the display zone communication apparatus transmits the product identifiers and the tool identifiers corresponding to the change to the product management apparatus, and
the product management apparatus links and stores the product identifiers and the tool identifiers corresponding to the change from the display zone communication apparatus, with each other.

4. The product management system according to claim 1, the product management system further comprising:
a tool communication apparatus provided on the holding tool, wherein the tool communication apparatus transmits first notification information when detecting that the holding tool has been taken out from the display zone, and the display zone communication apparatus reads the product identifier and the tool identifier via the wireless tag reader when receiving the first notification information from the tool communication apparatus.

5. The product management system according to claim 4, wherein the tool communication apparatus transmits second notification information when detecting that the holding tool has been returned to the display zone, and the display zone communication apparatus reads the product identifier and the tool identifier via the wireless tag reader when receiving the second notification information from the tool communication apparatus.

6. The product management system according to claim 4, the product management system further comprising:

a user communication apparatus carried by a user, wherein the user communication apparatus receives the first notification information from the tool communication apparatus, and transmits a user identifier indicating the user or the user communication apparatus and the first notification information to the product management apparatus.

7. The product management system according to claim 4, wherein the notification information includes the tool identifier, and the product management apparatus identifies the user having taken out the holding tool from the display zone based on the user identifier indicating the user communication apparatus from the user communication apparatus, and the product management apparatus identifies the product held by the holding tool taken out by the identified user based on the product identifier linked with the tool identifier included in the first notification information from the user communication apparatus.

8. The product management system according to claim 1, wherein the display zone communication apparatus reads the product identifier and the tool identifier at a first read timing, and thereafter reads the product identifier and the tool identifier at a second read timing, and in a case of determining that the number of the product identifiers and the tool identifiers read at the second read timing has changed relative to the number of product identifiers and the tool identifiers read at the first read timing, the display zone communication apparatus executes transmission of the product identifiers and the tool identifiers to the product management apparatus.

9. A product management apparatus, the product management apparatus being configured to manage a product, the product management apparatus comprising:

a receiver configured to receive a product identifier and a tool identifier read by a display zone communication apparatus from a product wireless tag and a tool wireless tag, respectively, from the display zone communication apparatus provided in a display zone in which at least one set of a product including the product wireless tag and a holding tool including the tool wireless tag is disposed; and a controller configured to link the holding tool and the product held by the holding tool with each other based on the product identifier and the tool identifier received by the receiver.

10. A display zone communication apparatus, the display zone communication apparatus being provided in a display zone in which at least one set of a product and a holding tool is disposed, the display zone communication apparatus comprising:

a wireless tag reader configured to read a product identifier from a product wireless tag provided on the product and read a tool identifier from a tool wireless tag provided on the holding tool; and a transmitter configured to transmit both the product identifier and the tool identifier read by the wireless tag reader to a product management apparatus configured to manage the product.

\* \* \* \* \*